United States Patent [19]

Hammer et al.

[11] 4,104,444
[45] Aug. 1, 1978

[54] FIBER REINFORCED CHEMICALLY MODIFIED PROTEIN ARTICLES

[75] Inventors: Klaus-Dieter Hammer, Mainz; Günter Gerigk, Oberursel; Max Bytzek, Naurod, all of Fed. Rep. of Germany

[73] Assignee: Hoechst Aktiengesellschaft, Frankfurt am Main, Fed. Rep. of Germany

[21] Appl. No.: 719,257

[22] Filed: Aug. 31, 1976

[30] Foreign Application Priority Data

Sep. 4, 1975 [DE] Fed. Rep. of Germany ....... 2539302

[51] Int. Cl.$^2$ ...................... A22C 13/00; B29D 23/01; C07G 7/00
[52] U.S. Cl. .................................... 428/474; 106/136; 106/147; 106/153; 106/154 Z; 106/161; 260/6; 260/112 R; 260/112 G; 260/117; 260/119; 260/123; 260/123.5; 260/123.7; 427/230; 427/338; 427/395

[58] Field of Search ............... 260/112 R, 119, 6, 117, 260/123, 123.5, 123.7, 112 G; 427/230, 338; 106/136, 147, 153; 428/474

[56] References Cited

U.S. PATENT DOCUMENTS

| 3,138,581 | 6/1964 | Young et al. ..................... 260/112 R |
| 3,833,022 | 9/1974 | Turbak et al. .......................... 428/36 |
| 4,002,485 | 1/1977 | Hammer et al. ..................... 106/136 |
| 4,002,710 | 1/1977 | Hammer et al. .............. 260/112 R X |

FOREIGN PATENT DOCUMENTS

| 1,181,909 | 11/1964 | Fed. Rep. of Germany. |
| 1,144,482 | 2/1963 | Fed. Rep. of Germany. |
| 1,940,799 | 2/1971 | Fed. Rep. of Germany. |

Primary Examiner—Walter C. Danison
Attorney, Agent, or Firm—Richard L. Schwaab

[57] ABSTRACT

Disclosed are fiber-reinforced articles made of chemically-modified protein, such as sausage casings, and a method of producing such articles characterized by the steps of reacting a solution of a protein such as casein with at least two types of chemical modifying agents.

29 Claims, No Drawings

FIBER REINFORCED CHEMICALLY MODIFIED PROTEIN ARTICLES

BACKGROUND OF THE INVENTION

The present invention relates to a process for the manufacture of fiber-reinforced articles, especially tubes, from chemically-modified protein as well as to tubes produced by the process and to the use thereof as synthetic sausage casings.

The term "fiber-reinforced tube of chemically modified protein" includes both tubes which, apart from the fiber insert in their wall, consist essentially of the chemically modified protein and also tubes which in addition contain small amounts of other chemical compounds, the presence of which plays a notable part in determining the properties of the tube. For example, there may also be present secondary chemical plasticising agents and/or water.

With the term "impregnated fibrous tube" is included a fibrous tube in which the fibers, especially paper fibers, are surrounded by the impregnating chemical substances, and in which essentially all of the cavities between the fibers forming the fibrous tube are filled by the chemical substance, and in which a layer of the chemical substance used for the impregnation is positioned on both surfaces.

Before the invention of synthetic polymers, e.g., polyamides, polyesters and polyurethanes, attempts were made to produce shaped bodies of synthetic materials from natural polymers, for example cellulose or protein. Some of these, such as, for example, cellulose hydrate films, have withstood the competition from synthetic polymers and are still produced in large quantities today. Shaped structures based on protein did not become of any importance, however, owing to the fact that the properties, especially the mechanical properties, of structures made from such materials are not so good. Of the shaped structures based on natural materials, a large share comprised synthetic sausage casings based on collagen. By dissolving collagen in alkali, spinning the solution into acid precipitating baths and subsequent hardening, tubes are produced with properties which are, however, by no means satisfactory. Even today shaped structures of casein are still produced according to a complicated and expensive process. For this purpose casein has a little water added to it and is plasticised at elevated temperatures under pressure. Subsequently the shaped article produced from the plasticised material is treated with a formaldehyde bath and thereby hardened. For this treatment, approximately one week per mm of wall thickness of the article is necessary.

Casein-based fibers are produced by dissolving casein in NaOH or KOH, spinning the solution into acid precipitation baths, and subsequently crosslinking the substance which forms the shaped structure by means of formaldehyde. These fibers could not, however, equal the mechanical properties of wool, which they were intended to replace, and therefore did not become of commercial importance.

The above survey shows that for the manufacture of tubes it has proved possible to successfully use only those natural polymers which themselves possess good film-forming properties, such as, for example, cellulose hydrate and collagen. According to the tests which have been published so far, natural products, such as casein, gelatins, amyloses, alginates or the like, always produce brittle articles which have too low a strength and insufficient elasticity.

SUMMARY OF THE INVENTION

It is therefore an object of the present invention to provide an improved process for the manufacture of shaped articles from chemically-modified protein.

It is also an object of the invention to provide an improved process for the manufacture of fiber-reinforced articles from chemically-modified protein.

Another object of the invention resides in providing chemically-modified protein compositions having improved properties as well as improved shaped articles made from such compositions.

Still another object of the invention is to provide an improved process for producing chemically-modified protein compositions.

It is a specific object of the invention to provide improved tubes of fiber-reinforced, chemically-modified protein which are especially well suited for use as sausage casings.

In accomplishing the foregoing objects, there has been provided according to the present inventio a process for the manufacture of a fiber-reinforced article which comprises the steps of applying to a fibrous material a solution of a protein which has been modified by reaction with a least one compound of the formula III

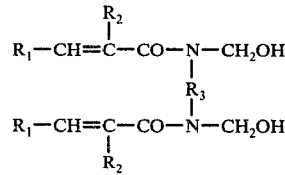

in which $R_1$ and $R_2$, which may be the same or different, represent hydrogen or an alkyl group having 1 to 6 carbon atoms, advantageously 1 to 3 carbon atoms, and $R_3$ represents a $(CH_2)_p$ group, in which p represents an integer from 1 to 8, inclusive, or a

group in which $R_4$ represents an alkyl group containing from 1 to 18 carbon atoms, and at least one compound of the formulae IIa, IIb, IIc or IId

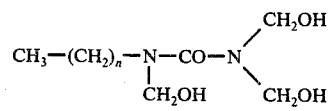

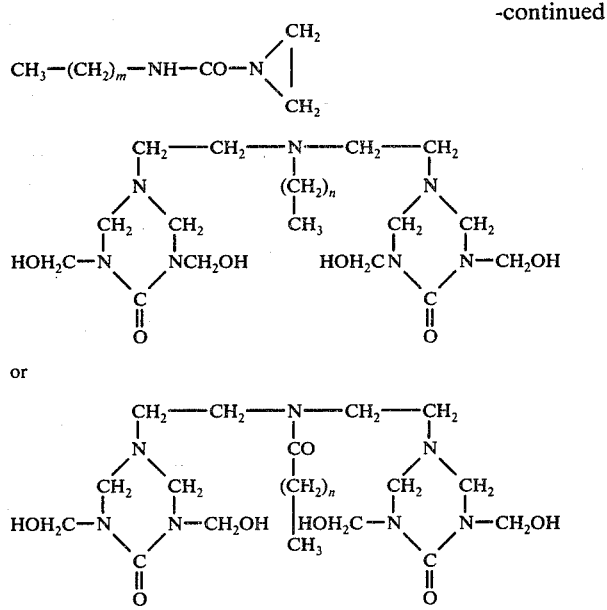

in which formulae, $n$ represents an integer between 9 and 24, inclusive, advantageously between 14 and 19 inclusive, preferably 17, and $m$ represents an integer between 11 to 19 inclusive, advantageously between 15 and 18, inclusive, and preferably 17. The fibrous material and applied solution are then passed into a precipitating liquid and treated with at least one saturated orgaic, preferably aliphatic, compound containing at least two reactive OH groups, at least two reactive $NH_2$ groups or at least one reactive $NH_2$ and at least one reactive OH group.

The inventio also provides chemically modified proteins obtainable by reaction of protein with compounds of the formulae II and III, and solutions thereof, and shaped structures produced by precipitation and reaction with the reactive OH and $NH_2$-group containing compounds.

More especially, the invention provides in one aspect a process for the manufacture of a tube of chemically-modified protein comprising the steps of extruding a protein solution through an annular slot die into precipitating liquid, applying a chemical cross-linking agent to the tube formed, and subsequently drying the tube, in which the protein solution is prepared by mixing an aqueous alkaline protein solution with an aqueous solution of at least one chemical compound of the general formula III in which $R_1$, $R_2$, $R_3$, $R_4$ and $p$ have the meanings given above, allowing the liquid mixture to stand, then admixing same with an aqueous dispersion of an alkyl-trimethylol-urea of the general formula IIa, in which $n$ has the meanings given above, or of an alkyl-ethylene-urea of the general formula IIb, in which $m$ has the meanings given above, or an aqueous solution of an alkylamine-bisdimethylene-triazinone-tetramethylol of the general formula IIc, in which $n$ has the meanings given above, or of an alkylamide-bisdimethylene-triazinone-tetramethylol of the general formula IId, in which $n$ has the meanings given above, or an aqueous liquid which contains at least two compounds of any one or more of the compounds of formula II, allowing this liquid mixture to stand for a period of time sufficient to form a reaction liquid which is in the spinnable-viscous state, then applying the reaction liquid continuously to the inside and/or outside of a fibrous tube, whereby it impregnates and coats the tube, contacting the tube with a precipitating liquid and subsequently with a washing liquid, and then treating the tube with an aqueous solution of an organic, saturated chemical compound having at least two reactive OH-groups or at least two reactive $NH_2$-groups, or at least one reactive OH-group and at least one reactive $NH_2$-group, per molecule. The tube is then heated and subsequently if desired or required, an aqueous liquid containing a chemical plasticising agent is made to act on it.

In another embodiment of the process according to the invention, the protein is prepared by mixing an aqueous alkaline protein solution with an aqueous dispersion of alkyl-trimethylolurea of the general formula IIa or in aqueous solution of a compound of the formula IIb, IIc, IId in each of which $m$ and $n$ have the meanings given above, or an aqueous liquid containing two or more such compounds, allowing the mixture to stand and subsequently mixing same with an aqueous solution of at least one compound of the general formula III in which $R_1$, $R_2$, $R_3$, $R_4$ and $p$ have the meanings given above, allowing the resulting reaction mixture to stand for a period of time sufficient to produce a reaction liquid which is then in the spinnable-viscous state, impregnating and coating a fibrous tube with this reaction liquid then precipitating and subsequently washing the impregnated and coated fibrous tube, followed by treating the tube with an aqueous liquid, which contains at least one organic, saturated, preferably aliphatic, compound having at least two reactive OH or at least two reactive $NH_2$ groups, or at least one reactive OH and at least one reactive $NH_2$ group per molecule. The tube is then heated and subequently, if desired or required, an aqueous liquid containing chemical plasticising agent is made to act on it.

DETAILED DESCRIPTION OF PREFERRED EMBODIMENTS

The present invention is based on the observation that protein may be chemically modified to produce a material which has good properties. The material itself is film-forming and may be used to impregnate fibers, for example, a tube of fibrous material, to give a product having useful strength and elongation properties. The products of the invention include tubes of chemically modified protein which have a fiber insert in their walls and have good physical properties, in particular regarding strength, elasticity and flexibility, and which may be used particularly advantageously as sausage casings.

The aqueous alkaline protein solution contains as the dissolved portion either gelatin, collagen, zein, peanut or wheat protein or casein, but preferably the dissolved protein is casein. It is, if desired, also possible to use protein solutions which contain a mixture of two or more of the mentioned proteins. The protein in the said solution is herein referred to as the "first chemical compound".

The aqueous alkaline protein solution advantageously contains an amount of protein in the range of from about 3 to 16% by weight, preferably in the range of about 7 to 12% by weight, calculated on the total weight of the solution.

Preferred are aqueous protein solutions which have a pH value in the range of from about 8 to 14, in particular in the range of from about 10 to 12. Particularly preferred are aqueous, ammoniacal protein solutions of the mentioned pH values.

Advantageously, the aqueous dispersions of alkyl-ethylene-urea, alkyl-trimethylol-urea and the aqueous solutions of alkylamine bisdimethylene-triazinone-tetramethylol or alkylamide-bisdimethylene-triazinone-tetramethylol in which the alkyl, in all cases, is preferably stearyl, contain the mentioned chemical compounds, which are herein referred to as "second chemical compounds", in each case in a quantity in the range of from about 5 to 30% by weight, preferably in a quantity in the range of from about 15 to 25% by weight, calculated on the total weight of the aqueous dispersion or aqueous solution. The mentioned second chemical compounds can be prepared in accordance with the instructions in German Pat. No. 1,181,909. Particularly preferred for carrying out the process is an aqueous solution of alkyl-, preferably stearyl-, amide-bis-dimethylene-triazinone-tetramethylol.

The aqueous solution which contains the chemical compound of the general formula III advantageously in a concentratiion in the range of from about 1 to 30%, preferably of from about 3 to 10%, by weight, calculated on the total weight of the solution, which is termed herein the "third chemical compound", may contain two or more such compounds. In this case the mentioned concentration values relate to the total weight of dissolved compounds.

The carbon-to-carbon double bonds of the third chemical compounds are reactive in an alkaline medium at low temperatures, whereas the N-methylol groups of the molecules are not reactive under these conditions. On the other hand, the N-methylol groups are reactive in weakly-alkaline to acid medium at high temperatures.

Preferred aqueous solutions containing the third chemical compound are those containing N-methylol-N,N'-methylene-bisacrylamide or N-methylol-N,N'-methylene-bismethacryl-amide in the concentration ranges indicated above.

The mentioned aqueous solutions or aqueous dispersions advantageously have a temperature in the range of from about 20° to 90° C., preferably one in the range of from about 15° to 30° C., before they are mixed with each other.

After the action of the precipitating liquid and washing liquid on the fiber-reinforced tube, the tube is treated with an aqueous solution of a saturated organic, in particular aliphatic, compound which has at least two reactive OH- or at least two reactive NH$_2$-groups per molecule or at least one reactive OH- and at least one reactive NH$_2$-group per molecule. These chemical compounds are herein referred to as the "fourth chemical compounds".

Suitable fourth chemical compounds are, in particular, diols, preferably aliphatic diols, such as, for example, glycol, propanediol and butanediol, aliphatic polyols, such as, for example, glycerol or pentaerythritol, polyglycols, such as, for example, a polyethylene glycol of the general formula

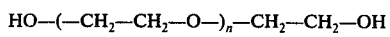

in which $n$ is an integer in the range between 1 and 20, preferably in the range between 1 and 5, and particularly preferably in the range between 1 and 3 (diglycol, triglycol, polyethylene glycol 200), or propylene glycol of the general formula

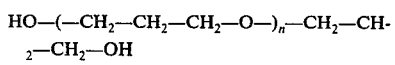

in which $n$ is an integer in the range between 1 and 10, advantageously in the range between 1 and 5, or derivatives of propane diol, pentaerythritol, and hexitols, such as mannitol, sorbitol or dulcitol, in which the hydrogen atoms of the OH groups are replaced by the following group

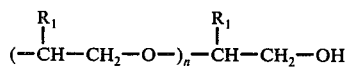

in which $x$ is an integer within the range from 1 to 6, and $R_1$ is hydrogen or the $CH_3$— group, diamines, especially aliphatic diamines of which the carbon chain has 1 to 6 carbon atoms, for example, ethylene diamine and hexamethylene diamine, polyamines, especially aliphatic polyamines, hydroxy amines, especially aliphatic hydroxy amines, for example 1-hydroxy-6-amino-hexane, as well as urea and melamine.

Of the group of diols, glycol in particular is preferred. The preferred polyol is glycerol. Preferred aliphatic diamines are ethylene diamine and hexamethylene diamine. It is also possible to use an aqueous solution of two or more of the fourth chemical compounds, in particular two or more of the preferred compounds.

The solution advantageously contains the fourth chemical compound in a total proportion in the range of from about 3 to 30%, preferably from about 8 to 15%, by weight, calculated on the total weight of the solution. Preferably, in both advantageous variants of the process, after the washing operation the tube is treated with an aqueous solution containing, in addition to the mentioned fourth chemical compound, a cyclic urea derivative and/or aminoplast precondensate, referredto as the "fifth chemical compound". Suitable cyclic urea derivatives are, for example, di-hydroxy-dimethylol-ethylene urea, dimethylol-ethylene urea, dimethylol-propylene urea and tetramethylol-acetylene diurea. It is also possible to use admixtures of chemically different fifth chemical compounds.

The mentioned fifth chemical compounds are contained in the aqueous solution of the fourth chemical compound in a quantity or a total quantity in the range of from about 0.1 to 10% by weight, preferably in a quantity or total quantity in the range of from about 0.2 to 2% by weight, calculated on the total weight of the solution.

Preferably the aqueous solution, which contains the fourth and optionally the fifth chemical compounds, contains, in addition, chemical substances which are capable of acting as reaction catalysts, for example, acids, preferably inorganic acids such as sulphuric acid, hydrochloric acid or the like, or salts of these acids with weak inorganic bases. Examples of such catalysts are ammonium chloride, magnesium chloride, zinc nitrate, zinc chloride and similarly acting substances. Chemical reaction accelerators of this kind are known.

The mentioned catalysts are advantageously used at a concentration in the range of from about 2 to 50 g/l in the said solution.

The process conditions for drying the tube are identical for the two preferred process variants. The same applies if the tube produced is in addition treated with a secondary plasticiser.

If the fourth chemical compound, as a result of its molecular structure, is capable of having a plasticising effect in the synthetic material of chemically modified protein forming the tube, then, by using it, an internally plasticised synthetic material of chemically modified protein is obtained. The plasticising agent, the fourth chemical compound, is in these cases securely incorporated in the synthetic material by chemical bonding.

In an externally plasticised synthetic material, the plasticiser is bonded merely by intermolecular forces in the synthetic material or between the molecules of the synthetic material and can therefore be removed by the action of suitable liquids. In the case of an internally plasticised material, on the other hand, the plasticiser is securely incorporated by chemical bonding and can not be or essentially can not be removed by customary solvents.

Those of the fourth chemical compounds suitable as internal plasticisers can also be incorporated as external plasticisers. The proportion of fourth chemical compound which is incorporated in the synthetic material, not by chemical bonding, but merely by intermolecular forces, provides an additional plasticising effect. If the fourth chemical compound does not possess any plasticising properties, plasticising of the synthetic material can be effected, if desired, by incorporating after its manufacture one or more known secondary plasticising agents, such as, for example, dibutyl adipate, adipic acid-butyleneglycol-polyester, di-n-hexyl phthalate, sulphomethylamide, polyvinyl ether, dioctyl sebacate, dibenzyl sebacate, diethyl phthalate, di-n-butyl phthalate, glycerol triacetate, hexanetriol triacetate, glycerol tripropionate, or dicyclohexyl phthalate, and also glycerol, glycol or triglycol. For this purpose the tube is treated with a plasticiser solution which advantageously contains the plasticiser at a concentration in the range of from about 20 to 200 grams, preferably from about 80 to 100 grams, of plasticiser per liter of liquid. The time of reaction with the plasticiser solution is advantageously controlled in such a manner that the tube contains secondary plasticiser in the range of from about 5 to 50%, preferably in the range of from about 8 to 30%, by weight calculated on the total weight of the tube. It is of course possible to impart to fiber-reinforced tubes produced in accordance with the invention, in which the synthetic material is internally-plasticised by the fourth chemical compound, additional plasticisation above and beyond this by the incorporation of a secondary plasticising agent.

The aqueous solution advantageously used as the precipitating liquid is known by the "Mueller bath". These precipitating liquids are aqueous solutions which contain from about 0.5 to 20%, preferably from about 1 to 5% by weight $H_2SO_4$ and from about 0.5 to 30%, preferably from about 6 to 20% by weight $(NH_4)_2SO_4$ and/or from about 0.5 to 30%, preferably from about 6 to 20% by weight of $Na_2SO_4$. The precipitating liquid advantageously has a temperature in the range between about 20° and 100° C. preferably in the range between about 20° and 60° C.

The fourth chemical compounds first become reactive at elevated temperature and are therefore employed preferably with the use of the above-mentioned, conventional reaction catalysts.

Both preferred variants of the process according to the invention are carried out in the manner described by way of example as follows.

Preparation (a) Protein, preferably, for example, casein, is soaked in water while stirring, and dissolved colloidally by adding $NH_4OH$ or $NaOH$, for example by the addition of the quantity of concentrated (25% by weight) $NH_4OH$ or $NaOH$ necessary to obtain a desired pH value, so that the resulting solution advantageously contains 3 to 16, preferably 7 to 12%, by weight of protein, based on the total weight of the solution. Advantageously, the ratio of protein to $NH_4OH$ is between 1:0.4 and 1:1. The pH value of the alkaline solution preferably lies between 8 and 10.

(b) By dissolving an appropriate amount of second chemical compound, for example, stearylamine-bis-dimethylene-triazinone-tetramethylol, in water, a 5 to 30% by weight, preferably 15 20% by weight, aqueous solution of this compound is prepared.

(c) By dissolving third chemical compound, for example, N-methylol-N,N'-methylene-bisacrylamide, in water, a 1 to 30% by weight, preferably 3 to 10% by weight, aqueous solution of the compound is produced.

($d_1$) A 2 to 15% by weight aqueous solution of fourth chemical compound, for example, glycerol, is produced by dissolving the appropriate quantity of fourth chemical compound in water. Preferably the solution also contains the above-specified inorganic acids of their specified salts with weak bases in the above-given concentrations.

($d_2$) For carrying out the two most preferred embodiments, a liquid is prepared which contains 2 to 15% by weight of fourth chemical compound, for example glycerol, as well as the catalyst in the indicated amount, and in addition 0.1 to 10, preferably 0.2 to 2% by weight of fifth chemical compound, for example, dimethylol-ethylene urea, calculated on the total weight of the solution.

(e) By dissolving sulphuric acid, ammonium sulphate and/or sodium sulphate in water, a solution is produced which contains 0.5 to 20% by weight, preferably 1 to 5% by weight of sulphuric acid, 0.5 to 30% by weight, preferably 6 to 20% by weight of ammonium sulfate and/or 0.5 to 30% by weight preferably 6 to 20% by weight of sodium sulphate. The mentioned liquids are used at a temperature in the range between 5° and 25° C., preferably at room temperature.

Procedure for Process Variant No. 1

An aqueous solution of first chemical compound, for example, one according to (a), is mixed with an aqueous solution of a third chemical compound, for example according to (c), while stirring, for example in such quantitites that the resulting liquid mixture contains an amount in the range of from 0.3 to 25%, preferably 2 to 12%, by weight of third chemical compound calculated on the weight of the first chemical compound.

Within seconds (approximately 10 to 50 seconds) there occurs spontaneously an extremely marked increase in viscosity of the liquid mixture, and the reaction mixture becomes a gel-like solid. After a standing period, for example 2 hours, the viscosity of the gel-like reaction mixture at room temperature drops considerably. At this point liquid containing second chemical compound, for example a liquid prepared according to (b), is admixed with the liquid reaction mixture so that the resulting liquid mixture contains a quantity in the range of from 0.5 to 50% by weight, preferably 2 to 20% by weight, of second chemical compound, based on the weight of the first chemical compound.

The viscosity of the liquid then increases slightly again. After standing for 4 to 8 hours, from the time of adding the solution containing the second chemical compound, the liquid has a viscosity which renders it spinnable (spinning viscosity: 80 to 250 falling ball seconds).

Then, by means, for example, of an annular slot die, e.g., of the type according to German Auslegeschrift No. 1,965,130, the spinnable viscous liquid is applied both to the outside and inside of a tube of paper fibers, whereby the tube is impregnated with this liquid and a layer of the liquid is formed on both its surfaces. The paper fiber web (overlapped and glued at the edges) forming the tube has a weight per unit area of 15 to 30 g/m². The tube is continuously passed through the annular slot of the die, for example, at a speed in the range of from 4 to 30 m/min., preferably in the range of from 6 to 20 m/min.

The paper fiber tube impregnated and coated inside and out (fiber-reinforced tube) is then passed at the above-mentioned speed, in the perpendicular direction, into a trough arranged below the annular slot die, which trough contains aqueous precipitating liquid, or example, one according to (e). The air gap from the outlet of the annular slot die to the surface of the precipitating liquid in the trough is, for example, 50 cm, which is sufficient to achieve uniform wetting and penetration of the tube of fibrous paper with the impregnating chemical substance, so that even the overlapping parts of the tube formed from the fibrous web attain adequate strength.

The trough containing the precipitating liquid has, for example, a length in the range of from 1 to 4 m., preferably 2 to 3 m. In the region of the base of the trough, below the surface of the liquid, is a rotatably drivable guide roller. The tube entering into the liquid is passed round the guide roller and then upwardly and back out of the precipitating liquid.

The precipitating liquid is fed to the inside of the tube through a pipe, which extends almost to the height of the guide roller, and is removed through a second pipe which ends at the level of the outer surface of the liquid. These purely procedural steps are conventional. The precipitating bath has, for example, a temperature of 20° to 90° C., preferably of 25° to 50° C.

After leaving the trough containing precipitating liquid the tube is flattened, and in this form passes through two or three more troughs containing further precipitating liquids in order to complete the precipitating process. If desired, the subsequent baths may be the same as that of the first trough, except that the concentration of the individual constituents decreases from trough to trough.

After treating the tube with precipitating liquid, it is treated with washing liquid, for example, water, by passing it through a trough.

After treating the tube with washing liquid it is passed continuously through a trough containing an aqueous solution of fourth chemical compound, for example according to $d_1$). According to a preferred embodiment of the process, after washing with water, the tube is passed through a trough which contains an aqueous solutuion of fourth and fifth chemical compound, for example, according to $d_2$).

After this treatment, the tube is subjected to heat, for example a temperature in the range of from 80° to 160° C., preferably 100° to 130° C., for example by passing it continuously through a heating channel of corresponding temperature. For good cross-linking and thorough fusion of the chemical composition forming the tube, after the first drying zone, the tube is advantageously passed through another, in which it is exposed to infra-red rays.

In the zone in which heat acts on the tube, the tube is in each case in the inflated state as a result of supporting air inside it. The volume of supporting air is enclosed in the said region of the tube as a result of the fact that the tube is pressed together at the beginning and at the end by inlet and outlet squeeze rollers, through the correspondingly narrow nip of which the tube is continuously passed. The supporting air is forced into this area of the tube at the start-up of the process.

The tube advantageously contains a plasticiser, in the form of the fourth chemical compound, in an amount within the range of from 2 to 40% by weight, part of which is internally incorporated in the synthetic material by chemical bonding, whereas the other part is bonded by intermolecular forces.

The paper fiber-reinforced tube of synthetic material of chemically modified protein has good physical properties. The tear strength of a tube under the conditions of 55% relative humidity and 20° C. is in the range between 1 and 9 kp/mm², its elongation at tear is in the range between 5 and 40% and the bursting pressure is between 4 and 12 m. $H_2O$.

Even when the tube is wet, the tear strength is still between 0.5 and 5 kp/mm², its elongation at tear is then 15 to 50% and the bursting pressure is 0.5 to 5 m. $H_2O$.

The synthetic material forming the tube has a swelling value (percentage by weight water content after storage in water) of between 35 and 220%, preferably in the range of between 40 and 80%.

The seam and edges of the tube are not weak areas. Should they become damaged during the spinning process this fault is evened out again in the drying process, since the chemically modified synthetic material is one with thermoplastic properties.

It is believed that the good physical properties of the tube are in part achieved by the fact that the synthetic material of chemically modified protein is chemically bonded to the cellulose fibers of its fibrous insert.

Procedure for Process Variant No. 2

An aqueous protein solution, for example, according to (a), is mixed with aqueous solution of second chemical compound, for example according to (b), in such a quantity that the resulting liquid mixture contains protein in a quantity in the range of from 5 to 20% by weight, preferably between 8 and 15% by weight, calculated on the total weight of the liquid. The second chemical compound is present in the range of from 0.2 to 25%, preferably 4 to 12%, by weight, based on the protein.

An aqueous solution of third chemical compound, for example according (c), is added to the liquid containing the first and second chemical compound in such a quantity that the resulting liquid mixture contains a total quantity of third chemical compound in the range of from 0.1 to 15% by weight based on solids content.

This liquid mixture is allowed to stand for a period at room temperature, for example for in range of from 1 to 4 hours, preferably 2 hours. There occurs spontaneously, and within a short time (approximately 10 to 50 seconds), a marked increase in viscosity of the liquid, which results in a gel-like solid reaction mixture. This is allowed to stand at room temperature for a period in the range of, for example, 4 to 8 hours. After this period the reaction mixture is in the spinnable-viscous state (spin-viscous). It has a viscosity of 80 to 250 falling ball seconds.

For carrying out the remainder of the second variant of the process, the spinnable viscous liquid is then treated as described in the description for carrying out the first variant. The paper fiber tube is impregnated and coated with the liquid in the manner stated, introduced into the above-described precipitating liquid, washed with water and subsequently subjected to the action of an aqueous solution of fourth chemical compound, for example one according to ($d_1$) or of an aqueous solution of fourth and fifth chemical compound, for example one according to ($d_2$). The tube is then heated under the conditions as indicated for carrying out the process according to the first variant.

It is accordingly possible, with an equal degree of success regarding good properties of the end product of the process, to operate according to either one or the other variant. The properties of tubes produced by the first variant are similar to those of tubes produced by the second.

The first, second, third and fourth chemical compounds, which are described in detail, as well as their methods of manufacture are known.

The following Examples illustrate the invention without being in any way limitative.

EXAMPLE 1

800 g of casein (corresponding to 703 g of pure milk protein) are uniformly dispersed in 5,244 ml of water while stirring. The protein is then soaked for an hour after which 340 ml of 25% $NH_4OH$ is added to the liquid and the whole is stirred for 3 hours at room temperature. There results an aqueous, alkaline, colloidal protein solution. There is then added to this solution 320 ml of a 22% by weight aqueous solution of stearylamide-bisdimethylene-triazinone-tetramethylol (10% by weight based on the casein) uniformly, while stirring, wherein a slight increase in the viscosity of the liquid occurs. 2 to 3 ml of octanol are then optionally added to this liquid, for the purpose of eliminating foam.

The liquid is then allowed to stand for 2 hours and there is then rapidly and uniformly stirred in 840 ml of a 5% by weight aqueous solution of N-methylol-N,N'-methylene-bisacrylamide. The viscosity increases spontaneously within 10 to 20 seconds to a considerable extent. During this period there forms a gel-like, solid reaction mixture. The gel-like, solid reaction mixture is allowed to stand for from 4 to 8 hours at room temperature.

In the course of this time the viscosity of the mixture drops considerably and at the end of the mentioned time span it has a viscosity of approximately 180 falling ball seconds. This viscosity gives the liquid good spinning properties.

The liquid, which is in the spin-viscous state, is used for coating on both sides and impregnating a cellulose fiber tube. The cellulose fiber fleece forming the tube has a weight of 17 g/m² and a thicknes of 0.07 mm. The tube is made of a web of fiber fleece having a width of 204 mm by folding the same and gluing the overlapping zones.

The coating of the fiber fleece shaped into the tube is carried out by means of a coating nozzle as described in German Offenlegungsschrift No. 1,965,130 which makes it possible to coat the inside and outside of the fibrous tube uniformly with the liquid and to impregnate it.

The precipitating liquid is in a trough positioned beneath the outlet slot of the coating nozzle. The liquid surface is approximately 50 cm from the outlet. The precipitating liquid contains 50 grams of sulphuric acid and 150 grams of ammonium sulphate per liter, at a temperature of 40° C.

The fibrous tube, impregnated and coated on both sides, covers a distance of 2.60 meters inside the precipitating liquid. The direction of travel of the tube in the trough is reversed twice by guide rollers inside the trough below the surface.

After leaving the trough containing the first precipitating liquid the tube is introduced in flattened form into two further troughs, one after the other, containing precipitating liquid, the second trough containing a precipitating liquid which contains 20 grams of sulphuric acid and 100 grams of sodium sulphate per liter, whereas the third contains a precipitating liquid which has 10 grams of sulphuric acid and 100 grams of sodium sulphate per liter.

After the tube has passed through the precipitating liquid, it is passed through two successive water baths. The washed tube is then passed at 8 m/min continuously through a trough which contains an aqueous solution of 120 gm/liter of glycerol at 80° C. and a pH in the range of from 5 to 7. The pH is adjusted by the addition of an appropriate quantity of acid to the solution, for example by the addition of sulphuric acid.

Subsequently, the tube is passed continuously through a drying channel of a length of 50 meters. The channel is maintained at from 80° to 130° C. by hot air. At the inlet and outlet of the drying channel there are pairs of nip rollers through which the tube is passed. The section of tube between the pairs of nip rollers is inflated by introducing compressed air at start-up.

After leaving the drier, the tube is sprayed with water, giving it a water content of 8 to 10% by weight based on the total weight of the tube. The tube has a weight per square meter of 102 grams and a glycerol content of 28% by weight based on the total weight of the tube. The layer on the outside of the fibrous tube is approximately 0.03 mm thick and on the inside of the tube approximately 0.07 mm thick.

The properties of the tube produced are shown in the following table:

| Property | | at 55% Relative Humidity | In the Wet State |
|---|---|---|---|
| Tensile strength, longitudinal | kp/mm² | 5.6 | 3.2 |
| Tensile strength, transverse | kp/mm² | 4.6 | 2.8 |
| Elongation at tear, longitudinal | % | 14.0 | 26.0 |
| Elongation at tear, transverse | % | 18.0 | 32.0 |
| Bursting pressure | m . H₂O | 8.5 | 4.2 |
| Swelling value | % | 82.0 | — |

The tubes are particularly suitable for use as casings for hard sausage, since they have desirable adhesion and peeling properties.

EXAMPLE 2

Example 1 is repeated, but with the variation that the liquid through which the tube is conveyed, after passing through the precipitating liquid and washing liquid, contains 100 grams of glycerol and 20 grams of a 40% by weight aqueous solution of dihydroxy-dimethylol-ethylene urea per liter of liquid. The pH value of this solution is adjusted to a value of 3 to 4 by sulphuric acid. The tube has a weight per square meter of 104 grams, and a glycerol content of 22% by weight calculated on the total weight of the tube.

| Property | | At 55% Relative Humidity | In the Wet State |
|---|---|---|---|
| Tensile strength longitudinal | kp/mm² | 6.5 | 3.8 |
| Tensile strength, transverse | kp/mm² | 5.8 | 3.1 |
| Elongation at tear, longitudinal | % | 12.0 | 23.0 |
| Elongation at tear, transverse | % | 14.0 | 30.0 |
| Bursting pressure | m . H₂O | 9.0 | 4.6 |
| Swelling value | % | 68.0 | — |

The tube is particularly suitable as a synthetic casing for hard sausage. Adhesion and peeling characteristics are further enhanced when using this tube.

EXAMPLE 3

This example is carried out as in Example 1, but with the variation that a 5% by weight aqueous solution of N-methylol-N,N'-methylene-bismethacrylamide (6.5% calculated on casein) is used. The resulting product has comparable properties.

EXAMPLE 4

Example 1 is again repeated, but with the variation that a 22% by weight aqueous solution of stearylamide-bisdimethylene-triazinone-tetramethylol (15% by weight based on casein) is used. The resulting product has comparable properties.

EXAMPLE 5

The procedure is again as in Example 1, but with the variation that a 20% by weight aqueous dispersion of stearyl-ethylene-urea (8% based on casein) is used. The product is again comparable.

EXAMPLE 6

Example 1 is repeated, but with the variation that a 20% by weight aqueous dispersion of stearyltrimethylol urea (12% based on casein) is used. A comparable product is obtained.

What is claimed is:

1. A process for the manufacture of a fiber-reinforced article which comprises the steps of (a) applying to a fibrous material a reaction liquid comprising a modified protein which has been modified by reaction with at least one compound of the formula III

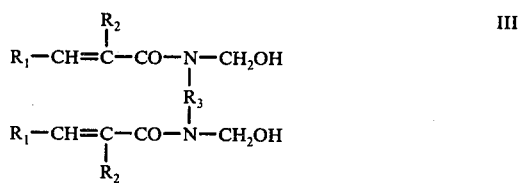

in which $R_1$ and $R_2$, which may be the same or different, represent hydrogen or an alkyl group having 1 to 6 carbon atoms, and $R_3$ represents a $(CH_2)_p$ group, in which $p$ represents an integer from 1 to 8 inclusive, or a

group
in which $R_4$ represents an alkyl group containing from 1 to 18 carbon atoms, and at least one compound of the formulae IIa, IIb, IIc or IId

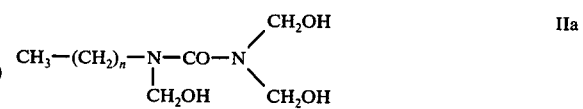

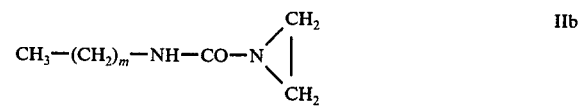

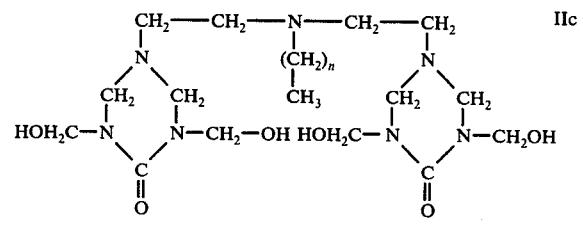

or

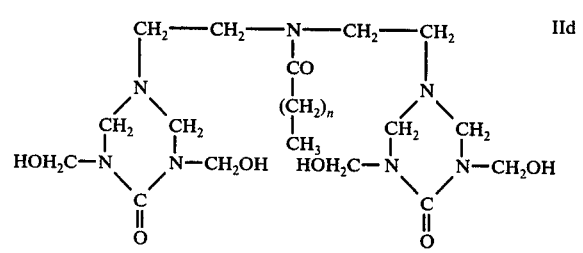

in which formulae $n$ represents an integer between 9 and 24, inclusive, and $m$ represents an integer between 11 and 19, inclusive, and which is a reaction product obtainable by reacting a protein solution containing about 3 to 16% by weight of a protein the pH value of which is sufficiently high to insure the dissolution of the protein with a liquid formulation containing about 5 to 30% by weight of at least one compound of the formulae IIa, IIb, IIc or IId, and a solution containing about 1 to 30% by weight of at least one compound of the formula III at a temperature and for a period of time sufficient to form the modified protein, to produce a coated and/or impregnated product, (b) passing said product into a liquid precipitating agent for the modified protein and (c) treating the product of step (b) with a cross-linking agent comprising at least one saturated organic compound containing at least two reactive OH groups, at least two reactive $NH_2$ groups or at least one reactive $NH_2$ and at least one reactive OH group.

2. The process as defined by claim 1, comprising the steps of mixing an aqueous alkaline protein solution with an aqueous solution of said compound of the formula III, allowing the mixture to stand for a predetermined period of time, then mixing therewith an aqueous dispersion of one of said compounds of the formula IIa or IIb or with an aqueous solution of one of said compounds of formula IIc or IId, allowing this mixture to stand until it becomes a spinnable liquid, applying the liquid to the inside and outside of a fibrous tube to coat and impregnate it, precipitating the liquid, washing the tube, treating the washed tube with an aqueous solution of a cross-linking agent comprising a saturated organic compound containing at least two reactive OH groups, at least two reactive $NH_2$ groups, or at least one reactive $NH_2$ and one reactive OH group, and drying the tube.

3. The process as defined by claim 1, comprising the steps of mixing an aqueous alkaline protein solution with an aqueous dispersion of one of said compounds of the formula IIa or with an aqueous solution of one of said compounds of the formulae IIb, IIc or IId, allowing the mixture to stand for a predetermined period of time, then mixing therewith an aqueous solution of one of said compounds of the formula III, allowing this mixture to stand until it becomes a spinnable liquid, applying the liquid to the inside and outside of a fibrous tube to coat and impregnate it, precipitating the liquid, washing the tube, treating the washed tube with an aqueous solution of a cross-linking agent comprising a saturated organic compound containing at least two reactive OH groups, at least two reactive $NH_2$ groups, or at least one reactive $NH_2$ and one reactive OH group, and drying the tube.

4. The process as defined by claim 1 wherein $R_1$ and $R_2$, in formula III, represent an alkyl group having from 1 to 3 carbon atoms.

5. The process as defined by claim 1, wherein, in formulae IIa, IIc and IId, $n$ represents an integer within the range of from 14 to 19.

6. The process as defined by claim 1, wherein, in formula IIb, $m$ represents an integer within the range of from 15 to 18.

7. The process as defined by claim 5, wherein $n$ represents 17.

8. The process as defined by claim 6, wherein $m$ represents 17.

9. The process as defined by claim 1 wherein two or more of at least one of said compounds of the formulae II or III or of said cross-linking agents are used.

10. The process as defined by claim 1 further comprising subsequent to cross-linking the step of treating the modified protein with an aqueous solution of a plasticiser.

11. The process as defined by claim 1 wherein the protein is casein.

12. The process as defined by claim 1, wherein the solution of cross-linking agent also contains at least one compound selected from a cyclic urea derivative and an aminoplast precondensate.

13. The process as defined by claim 12, wherein the urea derivative is dihydroxy-dimethylol-ethylene urea, dimethylolpropylene urea, or tetramethylol acetylene diurea.

14. The process as defined by claim 12, wherein two or more ureas or precondensates are employed.

15. The process as defined by claim 12, wherein said urea and/or precondensate has a concentration of between about 0.1 and 10% by weight of the solution.

16. The process as defined by claim 15, wherein the concentration is from about 0.2 to 2%.

17. The process as defined by claim 1, wherein the cross-linking agent is glycerol or glycol.

18. The process as defined by claim 1 wherein a compound of the Formula IIc is used, and the compound is stearylamine-bis dimethylene-triazinone-tetramethylol.

19. The process as defined by claim 1, wherein the compound of the Formula III is N-methylol-N,N'-methylene-bisacrylamide or -bismethacrylamide.

20. A shaped structure prepared by the process of claim 1.

21. The process as defined by claim 1, wherein said step of applying comprises extruding said protein solution through an annular shaped extrusion orifice.

22. The process as defined by claim 1, wherein said cross-linking agent is selected from the group consisting of aliphatic polyols having from 2 to 10 carbon atoms, polyethylene glycol of the formula

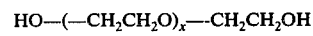

wherein $x$ is an integer between 1 and 20, polypropylene glycol of the formula

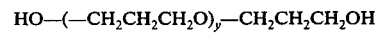

wherein $y$ is an integer between 1 and 10, derivatives of propane diol, pentaerythritol, and hexitols, such as mannitol, sorbitol, or dulcitol, wherein the hydrogen atoms of the OH groups are replaced by the following group

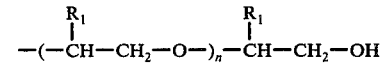

wherein $x$ is an integer within the range from 1 to 6, and $R_1$ is hydrogen or the $CH_3$- group, aliphatic polyamines having from 1 to 6 carbon atoms, aliphatic hydroxy amines having from 1 to 6 carbon atoms, urea, and melamine.

23. The process as defined by claim 12, wherein said solution of cross-linking agent contains between about 0.1 and 10 per cent of a compound selected from the group consisting of di-hydroxy-dimethylol-ethylene urea, dimethyl-ethylene urea, dimethylol-propylene urea, and tetramethylol-acetylene diurea.

24. The process as defined by claim 10, wherein said aqueous plasticiser solution contains between about 20 to 200 g/l of a plasticiser selected from the group consisting of dibutyl adipate, adipic acid-butyleneglycol-polyester, di-n-hexyl phthalate, sulphomethylamide, polyvinyl ether, dioctyl sebacate, dibenzyl sebacate, diethyl phthalate, di-n-butyl phthalate, glycerol triacetate, hexanetriol triacetate, glycerol tripropionate dicyclohexyl phthalate, glycerol, glycol, and triglycol.

25. The process as defined in claim 1, wherein the protein is selected from the group consisting of gelatin, collagen, zein, peanut protein, wheat protein, casein and mixtures thereof.

26. The process as defined in claim 1, wherein the amount of the compound of formula III is from about 0.3 to about 25% by weight relative to the amount of protein.

27. the process as defined in claim 1, wherein the amount of the compound of formulae IIa, IIb, IIc or IId is from about 0.5 to about 50% by weight relative to the amount of protein.

28. The process as defined in claim 1, wherein the reaction by which the modified protein is formed is effected at a temperature from about 20° C to about 90° C.

29. The process as defined in claim 1, wherein the pH value of the protein solution is from about 8 to about 14.

* * * * *

UNITED STATES PATENT OFFICE
CERTIFICATE OF CORRECTION

Patent No. 4,104,444            Dated August 1, 1978

Inventor(s) Klaus-Dieter HAMMER, Guenter GERIGK, Max BYTZEK

It is certified that error appears in the above-identified patent and that said Letters Patent are hereby corrected as shown below:

In Column 1, line 21, kindly delete "With" and insert instead -- Within --.

In Column 2, line 33, kindly delete "inventio" and insert instead -- invention --.

In Column 3, line 32, kindly delete "orgaic" and insert instead -- organic --.

In Column 3, line 36, kindly delete "inventio" and insert instead -- invention --.

In Column 5, line 58, kindly delete "high" and insert instead -- higher --.

In Column 6, second formula, kindly delete entire formula and insert instead

-- $HO-(-CH_2-CH_2-CH_2-O-)_n-CH_2-CH_2-CH_2-OH$ --.

In Column 6, line 62, kindly delete "referredto" and insert instead -- referred to --.

UNITED STATES PATENT OFFICE
CERTIFICATE OF CORRECTION

Patent No. 4,104,444    Dated August 1, 1978

Inventor(s) Klaus-Dieter HAMMER, Guenter GERIGK, Max BYTZEK

It is certified that error appears in the above-identified patent and that said Letters Patent are hereby corrected as shown below:

In Column 8, line 7, kindly delete "by the "Mueller bath" and insert instead -- by the name "Mueller bath" --.

In Column 8, line 40, kindly delete "15 20%" and insert instead -- 15 to 20% --.

In Column 9, line 49, kindly delete "or" and insert instead -- for --.

In Column 10, line 22, kindly delete "solutuion" and insert instead -- solution --.

In Column 10, bridging lines 39 and 40, kindly delete "continouosly" and insert instead -- continuously --.

In Claim 23, line 5, kindly delete "dimethyl-ethylene urea" and insert instead -- dimethylol-ethylene urea --.

UNITED STATES PATENT OFFICE
CERTIFICATE OF CORRECTION

Patent No. 4,104,444        Dated August 1, 1978

Inventor(s) Klaus-Dieter HAMMER, Guenter GERIGK, Max BYTZEK

It is certified that error appears in the above-identified patent and that said Letters Patent are hereby corrected as shown below:

In Claim 27, line 1, kindly delete "the" and insert instead -- The --.

Signed and Sealed this

Thirtieth Day of October 1979

[SEAL]

Attest:

RUTH C. MASON  
Attesting Officer

LUTRELLE F. PARKER  
Acting Commissioner of Patents and Trademarks